United States Patent [19]

van Zon

[11] 4,239,624

[45] Dec. 16, 1980

[54] APPARATUS FOR MEMBRANE FILTRATION HAVING AN IMPROVED DESALTING EFFECT

[75] Inventor: Cornelis van Zon, Zwolle, Netherlands

[73] Assignee: Wafilin B.V., Zwolle, Netherlands

[21] Appl. No.: 955,331

[22] Filed: Oct. 27, 1978

[30] Foreign Application Priority Data

Oct. 27, 1977 [NL] Netherlands .................. 7711845

[51] Int. Cl.³ .......................................... B01D 31/00
[52] U.S. Cl. .................................. 210/236; 210/456; 210/321.1; 210/433.2
[58] Field of Search ........... 210/321 R, 321 A, 321 B, 210/433 M, 456, 236

[56] References Cited

U.S. PATENT DOCUMENTS

| | | | |
|---|---|---|---|
| 3,401,798 | 9/1968 | Nyrop | 210/433 M |
| 3,485,374 | 12/1969 | Manjikian et al. | 210/321 |
| 3,616,929 | 11/1971 | Manjikian | 210/321 |
| 3,666,109 | 5/1972 | Goeldner | 210/321 R |
| 3,716,143 | 2/1973 | Clark | 210/321 R |
| 3,737,043 | 6/1973 | Clark | 210/321 R |
| 3,923,664 | 12/1975 | Grover et al. | 210/456 |

FOREIGN PATENT DOCUMENTS

| | | | |
|---|---|---|---|
| 53-35554 | 9/1978 | Japan | 210/321 R |
| 7206279 | 11/1973 | Netherlands | 210/321 |
| 7214986 | 5/1974 | Netherlands | 210/321 |

*Primary Examiner*—Frank A. Spear, Jr.
*Attorney, Agent, or Firm*—Wigman & Cohen

[57] ABSTRACT

An apparatus for membrane filtration comprises an inlet and an outlet, as well as a central permeate discharge tube. The supporting tubes supporting filtration membranes are disposed in two concentric rows. The outer row contacts the outer wall of the apparatus and the inner row contacts the permeate discharge tube. The centers of the supporting tubes of the first row are on a circle having a diameter of twice the diameter of the supporting tubes. The centers of the supporting tubes of the second row are on a circle having a diameter of $4 \times$ diameter of a supporting tube $\times \cos 15°$.

13 Claims, 5 Drawing Figures

APPARATUS FOR MEMBRANE FILTRATION HAVING AN IMPROVED DESALTING EFFECT

BACKGROUND OF THE INVENTION

The invention relates to an apparatus for membrane filtration comprising a vessel provided with a liquid inlet for the supply of liquids to be treated, a liquid outlet for the discharge of treated liquids and a permeate discharge tube, a plurality of supporting tubes surrounded by the vessel wall, each supporting tube supporting a non-woven tube, upon which a tubular filtration membrane is fixed and sealing members for sealing off the ends of each assembly of supporting tubes together with a nonwoven tube and a filtration membrane.

A similar device for membrane filtration, the perforated supporting tubes in the form of rigid plastic tubes being attached in openings of end plates, is known. As the supporting tubes are fixed in openings in plates, the supporting tubes are situated remote from each other at smaller or larger distances, but they never contact each other as this fixing of the supporting tubes does not allow for any contact.

In this known apparatus the permeate is discharged through a central permeate discharge tube being provided with bores, debouching into the free space of the vessel in which the supporting tubes are accommodated.

SUMMARY OF THE INVENTION

The invention now aims to provide an improved apparatus of this type.

Surprisingly it has been found that the desalting and the flux, to wit the total quantity of liquids passing through the membrane area at a certain pressure and temperature, can be notably increased by contacting the supporting tubes in a particular longitudinal configuration, and preferably clampingly interacting with each other and with the wall of the vessel in which the supporting tubes are disposed and the wall of a central permeate discharge tube.

Thus the invention provides an apparatus for membrane filtration comprising a vessel provided with a liquid inlet for the supply of liquid to be treated, a liquid outlet for the discharge of treated liquid and a permeate discharge tube, whereby a plurality of supporting tubes is surrounded by a vessel wall, said supporting tubes supporting a non-woven tube upon which a filtration membrane is attached, and sealing means for sealing off the end of each assembly of a supporting tube, non-woven tube and membrane, the supporting tubes contacting each other, in a longitudinal direction, wherein the apparatus comprises at least two, concentric rows of supporting tubes, the supporting tubes of the two rows contacting each other and the most outer parts of each supporting tube of the outer row being on a imaginary outer cylinder, the most inner part of each supporting tube of the inner row being on an imaginary inner cylinder.

In this way the desalting and the flux of the membranes are notably increased, e.g. by 20 to 30%. This is partly due to the fact that a substantial smaller area is required for a given number of supporting tubes and thus membranes. Such an improvement in the desalting and in the flux per surface area of the apparatus however, remains very surprising and is certainly not obvious.

The abovementioned phenomenon is difficult to explain, but it is assumed that the particular longitudinal contact of the supporting tubes, in particular a clamping interaction of the supporting tubes, causes the assembly of supporting tubes and membranes to become more rigid such, that this contributes to a notable improvement of the properties of desalting and the quantity of liquids passing through the membranes.

As already emphasized, a plurality of supporting tubes of the assembly of supporting tubes adjoin the wall of a central permeate discharge channel, thus resulting in a very tight packing of the supporting tubes in the circular space bounded by the sleeve or cover of the vessel and the outer side of the permeate discharge tube.

The apparatus as described hereinbefore is easily manufactured as a large number of supporting tubes internally comprising filtration membranes, can be pressed into a cylinder such, that two adjacent tubes always contact each other whereas each supporting tube further interacts with the cover or sleeve or with another pressure supporting tube, the outside of the permeate discharge tube respectively.

The cross sectional surfaces of the open space between the various supporting tubes is preferably less than 35% and more preferably less than 25% of the surface of the cross section of the space between the sleeves or covers and the permeate discharge tube. This offers the advantage that a cleaning treatment of the permeate space of the apparatus in accordance with the invention only has to be performed with extremely little cleaning liquid.

A cylindrical sleeve or cover is received sealingly in a first end part and in a second end part, the first end part being provided with an inlet and an outlet, the second end part forming an open connection space between the outlet and the inlet side.

SURVEY OF THE DRAWINGS

FIG. 1 schematically shows an apparatus made in accordance with the invention;

DESCRIPTION OF A PREFERRED EMBODIMENT

Figure 1:
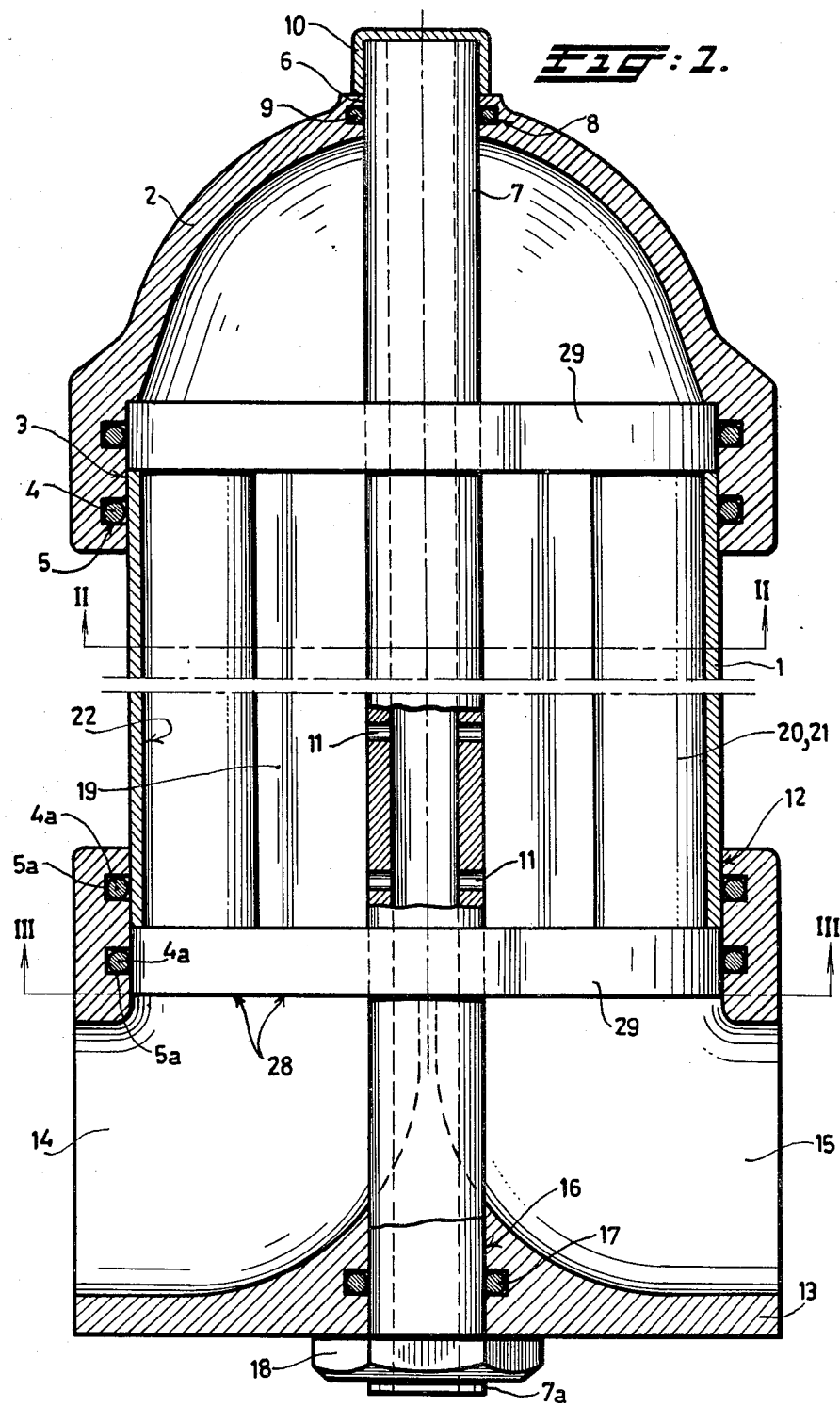

FIG. 1 shows an apparatus according to the invention consisting of an outer cylinder 1 which is received on the one hand in a circular recess 3 of the second end part or upper part 2. Sealing rings 4 accommodated in grooves 5, between the inner wall of the recess 3 of the upper part 2 and the outer side of the cylinder 1 provide an extremely good sealing.

The upper part 2 further comprises a passage 6 for the passage of a permeate discharge tube 7. A sealing ring 9 within a groove 8 seals off the permeate discharge tube 7 with respect to the wall of the passage 6 in the upper part 2.

The upper side of the permeate discharge tube 7 is closed off by means of a cover or cap 10.

The wall of the permeate discharge tube 7 comprises continuous bores 11 which constitute connections between the inside and the outside of the permeate discharge tube 7.

At the other end of the permeate discharge tube 7 the outer cylinder 1 is received in a further recess 12 of a first end part or lower part 13 of the apparatus which is sealed off by means of sealing rings 4a in grooves 5a. This lower part 13 of the device according to the invention comprises a liquid inlet 14 and a liquid outlet 15.

The lower part 13 further comprises a continuous bore 16, through which passes the permeate discharge tube 7. The tube 7 emerges from the lower part 13 into an open free end 7a for the discharge of permeate having penetrated the filtration membrane.

The permeate discharge tube 7 is connected by means of threading with a bolt 18. The permeate discharge tube 7 has substantially the same diameter as each supporting tube.

The inside of the bore 16 comprises sealing rings 17 so as to obtain a good sealing between said bore 16 and the permeate discharge tube 7.

Figure 5:
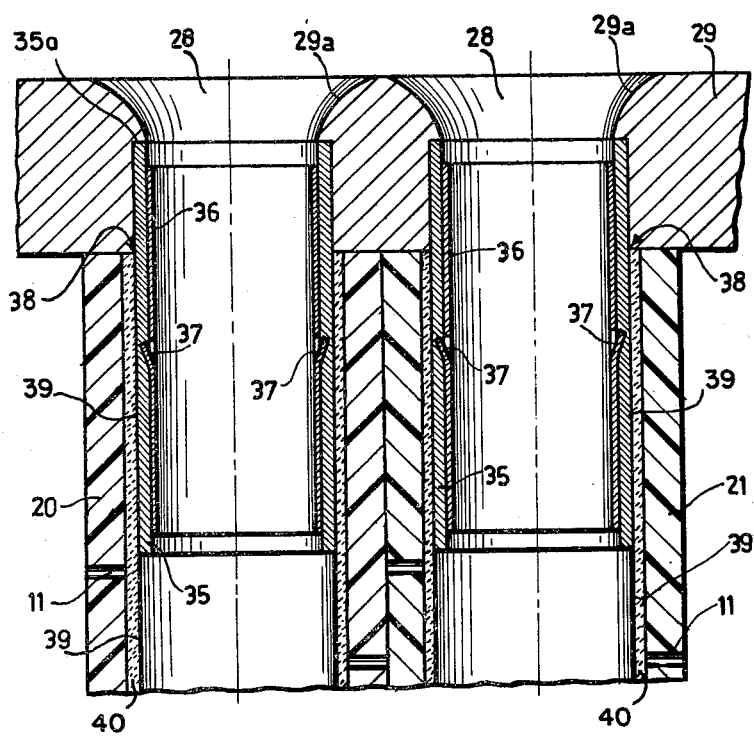
FIG. 5 shows an enlarged cross-sectional view of a flexible rubber tube part for sealing off the membranes.

Within the cylindrical space 1 supporting tubes 19-21 are made of polyvinylchloride, the inside of said supporting tubes 19-21 forming a support for a non woven tube 40 and a tubular filtration membrane 39. See FIG. 5.

Figure 2:
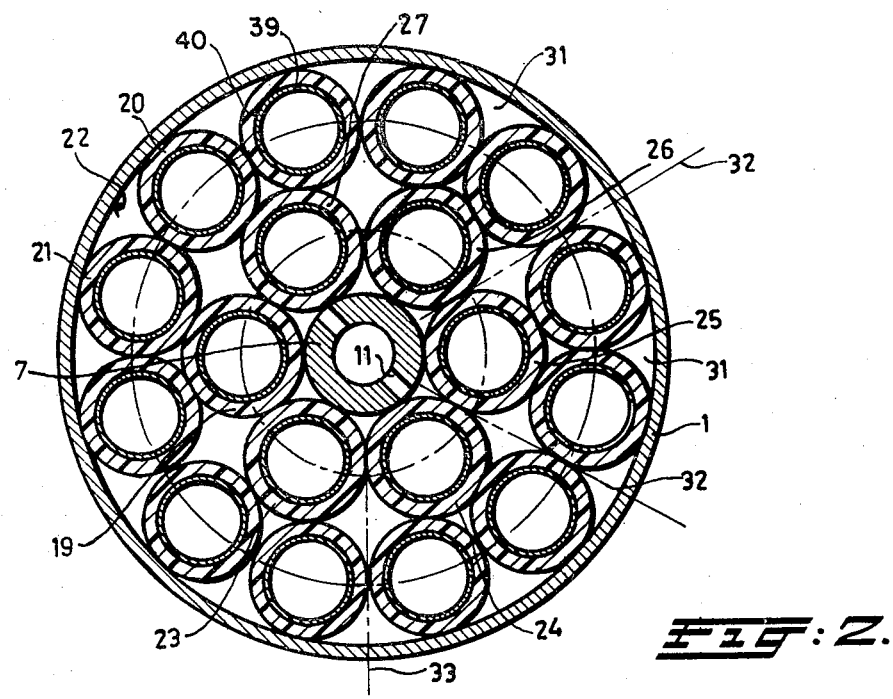
FIG. 2 shows a cross sectional view of an apparatus according to the line II—II in FIG. 1.

As can be seen in FIG. 2, the supporting tubes 19 and 23 interact with each other, clampingly, whereas supporting tube 21 interacts alternately with the tubes 19 and 20, while the tubes 20 and 21 clamp against or contact with the internal wall 22 of the cylinder 1.

Two cylinder halves can expediently be formed, as shown in FIG. 2, from supporting tubes whereby in each of said cylinder halves the supporting tubes and the cylinder halves proper, adjoin each other interclampingly. One cylinder half then comprises e.g. the tubes 19, 20 and 21 on the left-hand side of an imaginary divisional line 33, whereas a cylinder half comprising the tubes 24, 25 and 26 is situated on the right-hand side of said divisional line 33.

The tubes between the inner wall 22 and the wall of the permeate discharge tube 7 adjoin each other, preferably slightly clampingly.

The embodiment of FIG. 2 shows two cylinder halves on either side of a divisional line 33, causing the number of filtration membranes 39 from the inlet toward the outlet to be equal. In certain circumstances the lower part or the first end part 13 shown in FIG. 1 may, however, be constructed such that liquids to be treated pass through e.g. two thirds of the number of filtration membranes, whereafter liquids to be discharged pass through one third of the total number of filtration membranes toward the outlet, this in virtue of the fact that during the passage of liquid through two thirds of the number of filtration membranes, a quantity of permeate disappears from the liquid causing a drop in pressure in the apparatus. The drop in pressure is eliminated by using only one third of the total number of filtration membranes for the discharge of the liquid from the upper part 2. Discontinuous lines 32 in FIG. 2 show the division of filtration membranes from the liquid inlet 14 toward the upper part 2 and the number of filtration membranes from the upper part 2 toward the outlet 15.

The outer ring of filtration membranes 39 comprising the supporting tubes 20, 21, 23 can also be connected with the liquid supply 14, while the inner ring of tubes 19, 23, 24, 26, 27 can be used for discharge of liquid from upper part 2 toward the liquid outlet 15.

In the recess 12 and recess 3 shown in FIG. 1, there is a plate 29 having bores 28 and a central passage for the permeate discharge tube 7. The openings 28 in said plates 29 are such that their internal diameters are substantially equal to the diameter of the tubular filtration membrane 39 shown in FIG. 5.

Figure 3:
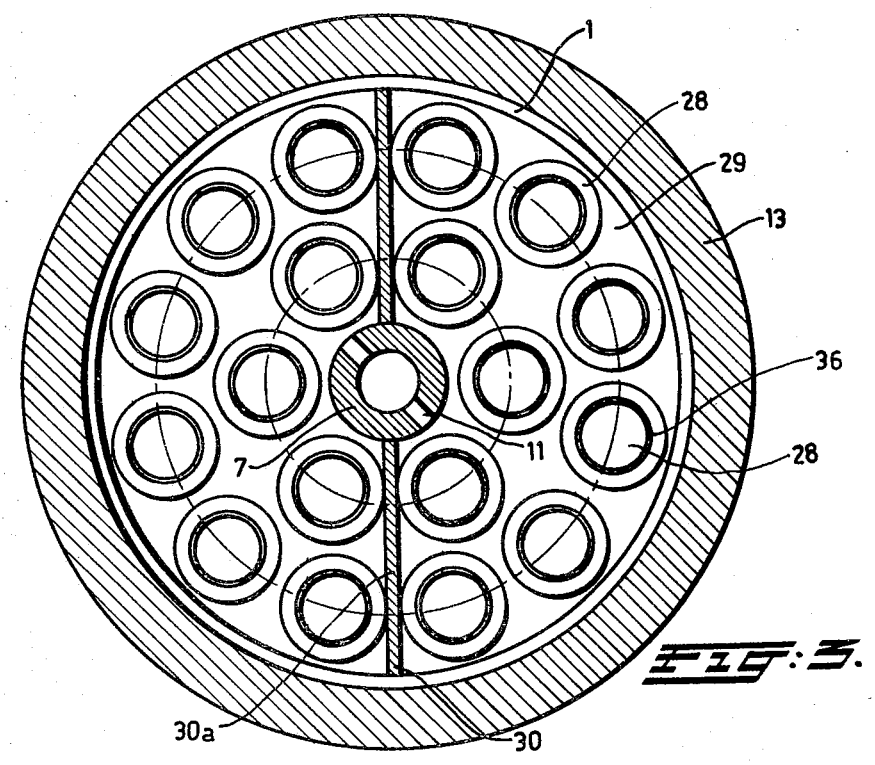
FIG. 3 shows a further cross sectional view according to the line III—III in FIG. 1.

A sealing wall 30 shown in FIG. 3 having a sealing strip 30a causes liquid to be treated and to be supplied through the liquid inlet 14 and further to be exclusively supplied to the plastic supporting tubes 20, 21, etc. at the left-hand side of the divisional line 33 in FIG. 2.

After having disposed the supporting tubes 20, 21 etc. in a cross section of the cylinder 1, the total free surface 31 is smaller than 35% of the total cross sectional surface of the space in which the supporting tubes are disposed.

Figure 4:
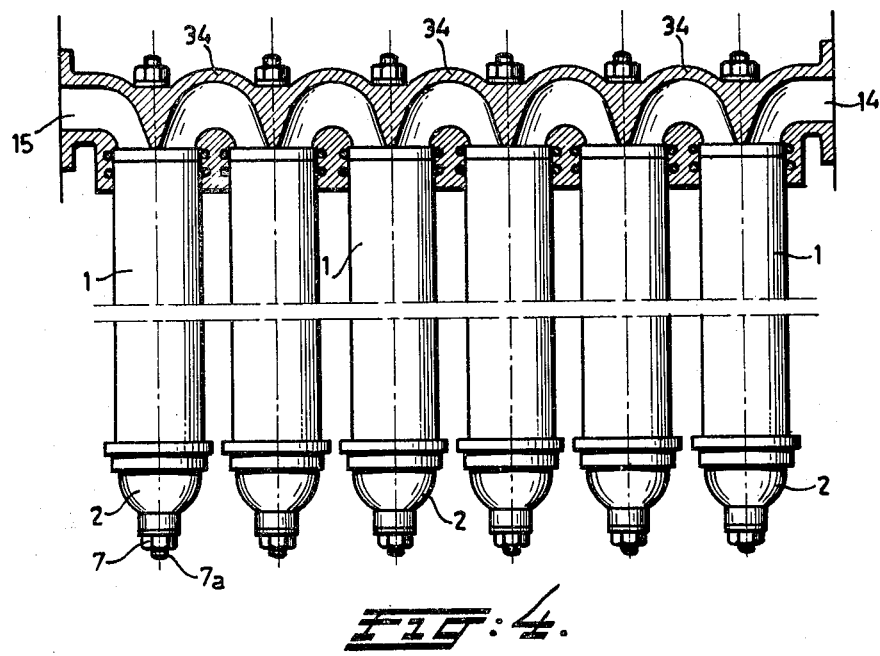
FIG. 4 shows an assembled apparatus comprising a plurality of apparatuses made in accordance with the invention.

FIG. 4 shows an apparatus comprising a plurality of intercoupled devices, as shown in FIG. 1.

It will be obvious that an extremely large membrane surface is obtained in this manner and that relative short membrane tubes can be used, which will simplify treating and handling said membranes.

As can be seen, there are special caps 34 in the apparatus of FIG. 4, which caps warrant a perfect connection between the outlet side 15 of a first device and the inlet side 14 of a second device, so that the desired configuration of membrane filtrates can be easily effected.

In the abovementioned case the supporting tubes have an external diameter of 20 mm, whereas the vessel has an internal diameter of 99 mm and an external diameter of 103 mm.

Expediently a flexible rubber tube part 35 is used for sealing off the membranes (see FIG. 5), the said rubber tube part 35 extending on either side of the straight side of a supporting tube. The rubber tube part 35 is received outside the supporting tube 20 in a recess 38 which extends to beyond the surface 35a being connected with the upper part 2. Said rubber tube part 35 has an outer diameter which equalizes the inner diameter of the filtration membrane 39; the outer diameter is mostly somewhat larger than the inner diameter of the filtration membrane 39. See FIG. 5.

So as to prevent that the rubber tube part 35 is entrained or collapses, a rigid sleeve 36 is fittingly or somewhat clampingly disposed within the said rubber tube part 35. The lips 37 of the said rigid sleeve 36 which consist preferably of plastics such as polyvinylchloride, are pressed outwards, and interact clampingly with the rubber tube part 35.

The lower and upper part of the openings 28 in the plates 29 being connected with the surface 29a, expediently have a tapering shape, so as to improve the flow of liquids.

The non-woven tubes 40 may also be supported by an encasing consisting of glass filaments then forming the supporting tube instead of by plastic supporting tubes of e.g. polyvinylchloride. Similar assemblies of membranes 39 and non-woven tubes 40, covered with glass filaments, are already known per se.

As shown in FIG. 2, the supporting tubes 19, 23, 24, 25, 26 and 27 form a first row and each tube contacts the outer circumference of the central tube or permeate discharge tube 7 which has the same diameter as the supporting tubes. The centers of supporting tubes 19, 23, 24, 25, 26 forming the first row on a circle have a diameter of twice the diameter of the supporting tubes.

The second or outer row of supporting tubes comprising e.g. tubes 20 and 21 is concentrical to the first row. Each tube of this outer row contacts the vessel wall and also another tube of this second or outer row. On the other hand the tubes of the outer row also contact the tubes of the first row.

The centers of the tubes of the outer row are on a circle having the diameter of 4×diameter of supporting tube×cos 15°.

The cylindrical vessel wall 1 has an inner diameter of

4×diameter of supporting tube×cos 15°+diameter of supporting tube.

The supporting tubes are clampingly engaged between the inner side of vessel wall 1 and outer side of permeate discharge tube 7.

What is claimed is:

1. An apparatus for membrane filtration comprising:
   a vessel provided with a liquid inlet for the supply of liquid to be treated,
   a liquid outlet for the discharge of treated liquid,
   a permeate discharge tube,
   two rows of round supporting tubes surrounded by a vessel wall and formed into an inner row and an outer row,
   each of said supporting tubes in the inner row and the outer row supporting internally a non-woven tube upon which a filtration membrane is attached internally,
   said two rows of supporting tubes contacting each other in a longitudinal direction,
   wherein the centers of the cross sections of the supporting tubes in the outer row and the centers of the cross sections of the supporting tubes in the inner row are on the circumference of two concentric circles formed by the two rows of supporting tubes.

2. The apparatus of claim 1, wherein the permeate discharge tube is a central tube, the outer wall of said central tube being in contact with the outer walls of the supporting tubes in the inner row.

3. The apparatus of claim 1, wherein, as seen in cross section, the centers of the supporting tubes in the inner row are on a circle having a diameter of twice the diameter of a supporting tube and the centers of the supporting tubes in the outer row are on a circle having a diameter being determined by the formula 4×the diameter of a supporting tube×cos 15°.

4. The apparatus of claim 1, wherein the inner diameter of the vessel wall is determined by the formula
   4×the diameter of a supporting tube×cos 15°+the diameter of the supporting tube
so that the vessel wall contacts the outer walls of the supporting tubes in the outer row.

5. The apparatus of claim 1, wherein the supporting tubes interact clampingly with each other and with the permeate discharge tube and with the vessel wall.

6. The apparatus of claim 1, wherein the vessel includes a first portion carrying the liquid inlet and the liquid outlet, said inlet and outlet being separated from each other by a partition wall.

7. The apparatus of claim 1, wherein the vessel includes a second portion comprising a cover or cap having an open inside.

8. The apparatus of claim 1, further comprising a plate with openings leading into a recess in the first and the second portions.

9. The apparatus of claim 1, wherein the supporting tubes are perforated polyvinylchloride tubes.

10. The apparatus of claim 1, further comprising a sealing sleeve inside each membrane inside each supporting tube.

11. The apparatus of claim 10, wherein each supporting tube is an encasing of reinforced filaments, preferably glass filaments.

12. The apparatus of claim 1, wherein half the supporting tubes supporting the membrane filtration tubes penetrate into the liquid inlet, whereas the other half penetrate into the liquid outlet.

13. The apparatus of claim 1, wherein the number of supporting tubes carrying the membrane filtration tubes penetrating into the liquid inlet exceeds the number of supporting tubes carrying the membrane filtration tubes penetrating into the liquid outlet.

* * * * *